W. S. PETERS.
FLOAT CONTROLLED CIRCUIT CLOSING MECHANISM.
APPLICATION FILED OCT. 18, 1913.

1,188,822.

Patented June 27, 1916.
3 SHEETS—SHEET 2.

W. S. PETERS.
FLOAT CONTROLLED CIRCUIT CLOSING MECHANISM.
APPLICATION FILED OCT. 18, 1913.

1,188,822.

Patented June 27, 1916.
3 SHEETS—SHEET 3.

Witnesses
G. M. Spring.
C. H. Crawford

Inventor
William S. Peters,
By Richard Owen,
his Attorney

UNITED STATES PATENT OFFICE.

WILLIAM S. PETERS, OF CEMENT, CALIFORNIA.

FLOAT-CONTROLLED CIRCUIT-CLOSING MECHANISM.

1,188,822.  Specification of Letters Patent.  Patented June 27, 1916.

Application filed October 18, 1913. Serial No. 796,014.

*To all whom it may concern:*

Be it known that I, WILLIAM S. PETERS, a citizen of the United States, residing at Cement, in the county of Solano and State of California, have invented certain new and useful Improvements in Float-Controlled Circuit-Closing Mechanism, of which the following is a specification.

The object of this invention is to provide a mechanism adapted to be actuated by different liquid levels for the purpose of closing an electric circuit or circuits through an annunciator, or for the purpose of starting or stopping any form of electrical device, either an indicator or an electric motor.

The device of my invention is adapted for disposition in the tank to be filled, or it may be disposed outside of such tank and in a separate tank connected with the main tank so that the liquid level in both tanks will be the same, the device of my invention serving to indicate or control the liquid level of the main tank.

The device of my invention is especially designed for gasolene tanks used with automobiles to indicate to the driver the level in the tank through the medium of an annunciator or like indicating mechanism.

The device of my invention will be more fully described in connection with the accompanying drawings and will be more particularly pointed out in and by the appended claims.

Figure 1:
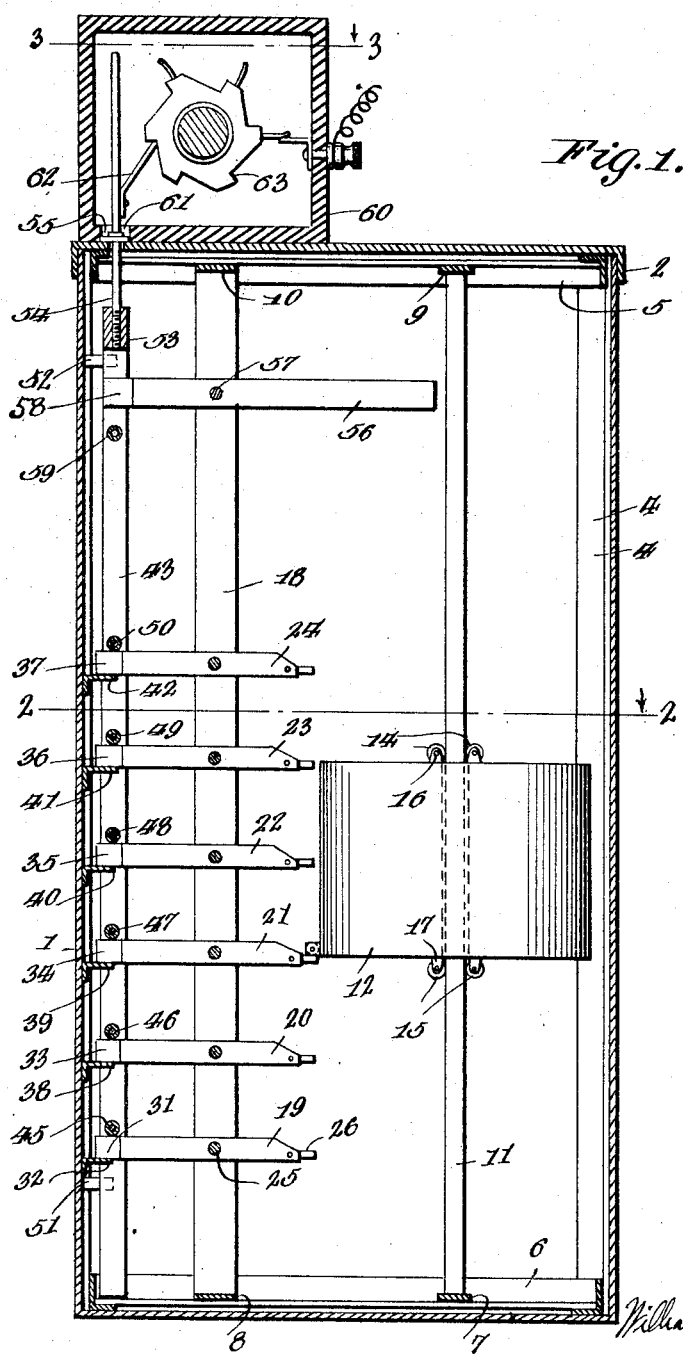
Figure 2:
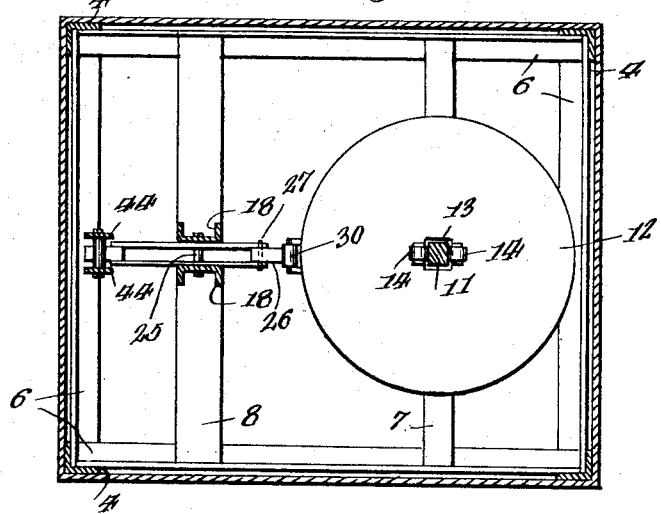
Figure 3:
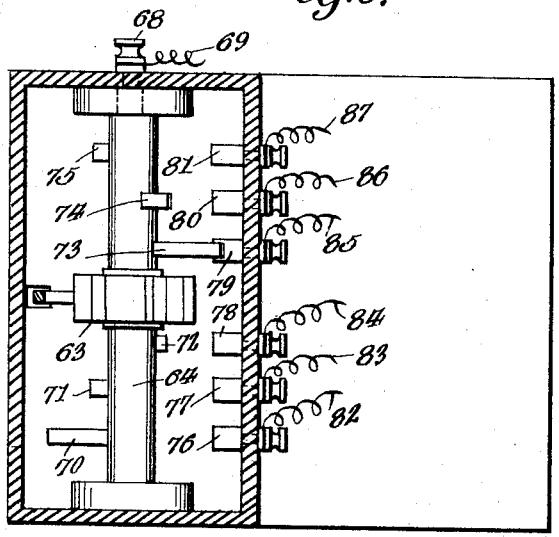
Figure 4:
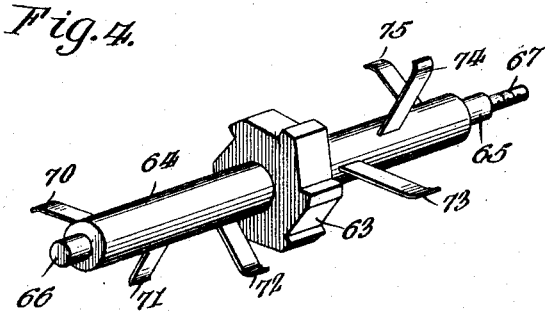
Figure 5:
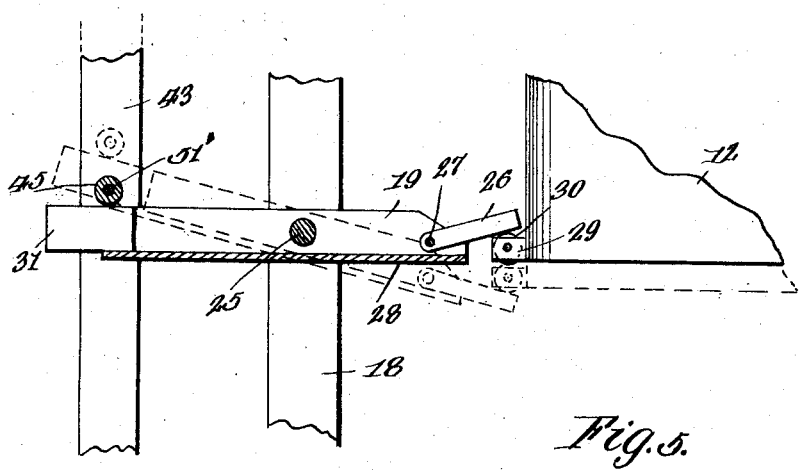

In the drawings:—Figure 1 is a vertical sectional view illustrative of one form of my invention. Fig. 2 is a horizontal sectional view on line 2—2 of Fig. 1. Fig. 3 is a sectional view on line 3—3 of Fig. 1. Fig. 4 is a detail view of a contact carrier. Fig. 5 is a fragmentary view of a portion of a float showing the manner in which it actuates one of the level indicating levers.

Like characters of reference designate similar parts throughout the different figures of the drawings.

As shown, 1 indicates a tank which may be provided with a removable cover 2. Within the tank I dispose a frame which may comprise angle uprights 4 which are suitably connected by transversely disposed upper and lower angle braces 5 and 6, respectively. Lower transverse braces 7 and 8, function as supports, and correspondingly disposed braces 9 and 10 are provided in the upper portion of the frame.

A float guide is shown in the form of a rod 11, of polygonal cross section, and which is mounted upon braces 7 and 9, extending vertically in the tank. A float is indicated at 12 and is provided with a passage 13 whereby it may slide upwardly and downwardly on the guide 11, the passage 13 being polygonal in cross section so as to prevent rotative movement of the float with respect to its guide 11. In order to reduce friction, I may provide the float with upper and lower pairs of anti-friction rollers 14 and 15, mounted in suitable bearings 16 and 17.

I provide supporting means for preferably pivotally supporting a plurality of superposed levers adapted for actuation by the float, and as shown, said support may comprise a pair of upright channels 18, mounted at their upper and lower ends on the braces 10 and 8, respectively. Between these channel uprights 18 I pivotally mount a plurality of levers indicated at 19, 20, 21, 22, 23 and 24, and as all of the levers are similar in construction, only one need be described in detail.

Lever 19 may comprise a channel strip pivotally mounted to the upright 18 at 25 at a point substantially between its ends, the pivots passing through the flanges of the channel. At one end of the lever, I pivotally mount a trip arm 26, at 27, in such a manner that the trip arm is free to be moved upwardly but will strike the web 28 so that downward movement of the trip arm 26, relatively to the lever 19 will be limited beyond a predetermined extent. The trip arms of all of the levers will lie in the path of a portion of the float so as to be actuated thereby, and as shown, the float 12 is provided with bearings 29 in which a roller 30 is journaled. During upward movement of the float 12, the roller 30 will idly actuate the trip arms 26 so as to permit upward movement of the float 12 without actuating the levers 19 to 24. Upon descent of the float, however, the roller 30 will successively actuate each trip arm of each lever as the level of the contents of the tanks lowers, for a purpose which will presently appear. The remaining ends of each of the levers are preferably provided with a weighted extension 31 which will normally engage a stop 32 so as to support the levers in the normal positions shown in Fig. 1. The weighted extensions for the remaining levers are indicated at 33 to 37, and the stops at 38 to 42.

The levers 19 to 24 are all arranged common to a contact actuating member which may be in the form of a reciprocating bar indicated as a whole at 43. Said bar 43 may comprise lateral sides 44 between which are mounted anti-friction rollers 45 to 50. Each roller may be mounted upon a connecting bolt 51', as indicated in Fig. 5, which extends through the sides 44. Suitable guides 51 and 52 hold the actuating member or rod 43 to a straight up and down line of travel. The upper ends of the slide members 44 are connected by a nut 53 into which is threaded a rod-like extension 50 for the actuator 43. The extension 54 extends upwardly through the lid 2 and is provided with a valve closure 55 so that in case the tank is filled too full, the valve closure 55 seating on the cover 2, will prevent passage of the contents of the tank past the valve closure 55.

In order to tightly seat the closure 55, I provide a lever 56, pivoted at 57, and adapted to lie in the path of the float 12 when the latter ascends. The remaining end of the lever 56 may be provided with an extension 58 for engagement with a roller 59 to depress the actuating member 43 and seat the closure 55. On the cover 2 I mount a contact box 60, which may be made of insulating material, and I provide an opening therein, as indicated at 61, for passage of the rod extension 54 into said box 60. The rod extension 54 is provided with a contact actuator which may be a spring ratchet pawl 62 adapted to engage ratchet teeth 63 of a contact carrier 64. Upon upward movement of the actuator 43, the spring pawl 62 will engage the ratchet teeth 63 and rotate the contact carrier 64, one step. Downward movement of the actuator will merely cause the spring pawl 62 to traverse the ratchet teeth idly. The carrier 64 may be mounted in bearings affording sufficient friction to prevent reverse movement of the carrier when the pawl 62 passes downwardly over the teeth.

The carrier 64 comprises a body of conducting material which is provided with journals 65 and 66, having bearings in the side walls of the contact box 60. The journal 65 is provided with a threaded extension 67 whereby a contact nut 68 may be turned thereon to connect the carrier 64 with one pole of a source of current through a wire 69. The ratchet wheel 63 is preferably of non-conducting material, such as fiber, and in the present construction, the same is provided with six teeth so that at each actuation, the carrier 64 will be rotated through one-sixth of a revolution. On each side of the ratchet wheel 63 I mount three spring contacts 70, 71, 72, 73, 74 and 75. Six contacts 76, 77, 78, 79, 80 and 81 are mounted upon the contact box in the path of the spring contacts on the carrier. As will be seen more particularly by reference to Fig. 4, the spring contacts on the carrier are mounted in advance of each other from one end to the other of the carriers so that at each partial revolution of the carrier one of the spring contacts will come into engagement with one of the fixed contacts and close circuit therethrough and through the respective lead or wire of the fixed contact. The fixed contacts are provided with wires 82, 83, 84, 85, 86 and 87, which may lead to an annunciator adapted to be disposed in the line of vision of the driver of an automobile, or otherwise located in accordance with the particular use to which the device of my invention is to be put. I have not shown an annunciator as the device of my invention is equally adapted to close circuit for the purpose of starting any kind of mechanism, or mechanisms, and therefore I have considered the disclosure complete, so far as my invention is concerned, by merely indicating the electrical connections.

It is believed that the operation will be clear from the foregoing description but it may be briefly recapitulated as follows: When the tank is filled the float 12 will rise and if the tank should be filled to overflowing, the overflow mechanism, comprising the lever 56 and its connection with the valve closure 55, would prevent the contents from flowing into the contact box 60. As the gasolene is used and the float 12 descends, it will first operate lever 24 and raise the actuator 43 to close circuit through the annunciator and indicate to the driver that the supply of gasolene has passed the highest float level to be indicated. As the float 12 descends farther, the remaining levers 23 to 19 will be actuated so as to indicate to the user just to what extent the level decreases. If for instance the level decreases to the extent that lever 21 is actuated, then the user will be able to calculate about when he can reach a point where he could get a new supply of gasolene, providing the device of my invention is employed in an automobile.

It will thus be seen that I have provided a float controlled circuit closing mechanism adapted for a wide range of utility and while I have herein shown and described one specific embodiment thereof, I do not wish to be limited thereto except for such limitations as the claims may import.

I claim:—

1. In a float controlled circuit closing mechanism, a tank for the liquid, a plurality of superposed levers in said tank, a circuit closing actuator common to said levers for actuation thereby, a circuit closing device connected for operation by said actuator, a float in said tank, and means for guiding said float during descent thereof to successively actuate said levers, substantially as described.

2. In a float controlled circuit closing mechanism, a tank for the liquid, a plurality of superposed levers in said tank, a circuit closing actuator common to said levers for actuation thereby, a circuit closing device connected for operation by said actuator, and a float for actuating said levers, substantially as described.

3. In a float controlled circuit closing mechanism, a rotatable contact carrier, a series of radial contacts affixed to the carrier, a corresponding number of fixed contacts disposed in the path of the mentioned radial contacts, a ratchet forming a part of the carrier, and reciprocable means mounted to engage the teeth of the ratchet and to successively move the radial contacts into engagement with the corresponding fixed contacts for the purpose specified.

4. In a float controlled circuit closing mechanism, a tank for the liquid, a vertically reciprocating actuator, a circuit closing device operatively connected to be operated by said actuator, a plurality of vertically superposed levers connected to operate said actuator when moved in one direction, stops for said levers limiting movement thereof in another direction, and a float for actuating said levers, substantially as described.

5. In a float controlled circuit closing mechanism, a tank for the liquid, a circuit closing device, a float in said tank, and mechanism including a plurality of fulcrumed superposed levers actuatable through movement of the float in one direction to reciprocate the actuator, the said levers being immovable upon movement of the float in the opposite direction for the purpose specified.

6. In a float controlled circuit closing mechanism, a tank for the liquid, a circuit closing device, a float in said tank, an actuator, a plurality of superposed fulcrumed levers mounted to engage the actuator, the mentioned levers being successively operable to reciprocate the actuator through movement of the float in one direction, and means carried by each lever to permit of movement of the mentioned float in the opposite direction without affect upon the actuator for the purpose specified.

7. In a float controlled circuit closing mechanism, a rotatable contact carrier adapted for connection with one pole of a source of current and provided with a ratchet wheel having a given number of ratchet teeth and a series of contacts equal in number to the number of teeth on said ratchet wheel, a plurality of fixed contacts corresponding in number to the number of said first-named contacts and disposed in the path thereof, float controlled mechanism for engaging said ratchet wheel to actuate said carrier and engage its contacts with said fixed contacts, and electrical connections leading from said fixed contacts for connection to the other pole of the source of current through the device to the operated, substantially as described.

8. In a float controlled circuit closing mechanism, a rotatable contact carrier adapted for connection with one pole of a source of current and provided with a ratchet wheel having a given number of teeth and a series of contacts equal in number to the number of teeth on said ratchet wheel and spaced one in advance of the other in alinement with said teeth, float controlled mechanism for engaging said ratchet wheel to advance said carrier the distance between two of its teeth, fixed contacts disposed in alinement for successive engagement by said first-named contacts, and wires connected with said fixed contacts for connection to the other pole of the source of current through the device to be operated substantially as described.

9. In a float controlled circuit closing mechanism, a tank for the liquid, a contact carrier, an actuator mounted within the tank to penetrate an opening formed in the top thereof, means on the actuator disposed in the path of movement of the float to close said opening by engagement of the float with said means, and means on the actuator to rotate the carrier substantially as described.

In testimony whereof I affix my signature in presence of two witnesses.

WILLIAM S. PETERS.

Witnesses:
A. J. STICE,
J. G. DAVISSON.